United States Patent
Hamm

(10) Patent No.: US 6,457,851 B2
(45) Date of Patent: Oct. 1, 2002

(54) HEADLIGHT ARRANGEMENT FOR A VEHICLE FOR PRODUCING LIGHT BEAMS WITH DIFFERENT CHARACTERISTICS

(75) Inventor: Michael Hamm, Pfullingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/746,538

(22) Filed: Dec. 19, 2000

(30) Foreign Application Priority Data

Dec. 22, 1999 (DE) .......................................... 199 61 942

(51) Int. Cl.⁷ .............................. B60Q 1/06; F21S 8/10
(52) U.S. Cl. ..................... 362/525; 362/523; 362/464; 362/420; 362/428; 362/419
(58) Field of Search ................................. 362/523, 525, 362/526, 531, 287, 282, 284, 322, 324, 507, 464, 465, 467, 420, 428, 419

(56) References Cited

U.S. PATENT DOCUMENTS

| | | | | |
|---|---|---|---|---|
| 1,127,327 A | * | 2/1915 | Walker | 362/525 |
| 4,196,459 A | * | 4/1980 | Dick | 362/549 |
| 5,436,807 A | * | 7/1995 | Kobayashi | 362/41 |
| 5,567,032 A | * | 10/1996 | Heizmann | 362/37 |
| 5,833,346 A | * | 11/1998 | Denley | 362/507 |
| 6,309,094 B1 | * | 10/2001 | Woerner | 262/539 |

* cited by examiner

Primary Examiner—Alan Cariaso
Assistant Examiner—Sharon Payne
(74) Attorney, Agent, or Firm—Michael J. Striker

(57) ABSTRACT

The headlight arrangement for a vehicle produces respective light beams with different characteristics and includes at least two headlight units (10), each having a number of individual headlights (12, 14, 16), by means of which the respective light beams are produced and operated simultaneously and/or in different combinations. The headlight unit (10) has at least one base headlight (12) by which a light beam with low beam characteristics is produced. In a basic or initial configuration the base headlights of two headlight units on opposite sides of the vehicle have substantially parallel optic axes (11) and their light beams are superimposed. The base headlights (12) may be pivoted in opposite directions from each other from their initial configuration about vertically extending axes (40) so that their optic axes (11) diverge or converge. The light beams produced by the base headlights (12) are no longer superimposed to the same extent so that lower intensities are provided in a central region in front of the vehicle but the illumination extends over a greater horizontal breadth in front of the vehicle when their light beams diverge. This is especially advantageous in city traffic and at low vehicle speeds.

13 Claims, 3 Drawing Sheets

HEADLIGHT ARRANGEMENT FOR A VEHICLE FOR PRODUCING LIGHT BEAMS WITH DIFFERENT CHARACTERISTICS

BACKGROUND OF THE INVENTION

1. Field of the Invention

The present invention relates to a headlight arrangement for a vehicle and, more particularly, to a headlight arrangement for producing respective light beams with different characteristics, which comprises at least two headlight units, each of which comprises a plurality of individual headlights, by which respective light beams are produced and which are operable simultaneously and/or in different combinations.

2. Prior Art

A headlight arrangement of this type is described in German Patent Document DE 43 13 914A1. This headlight arrangement has at least two headlight units each having a plurality of individual headlights. The individual headlights produce light beams with characteristic properties. The individual headlights can be operated alternately and/or simultaneously in different combinations. At least one individual basic headlight is provided, by which a basic light beam is produced with a low beam characteristic. The characteristics of the basic light beam are such that it fulfills the requirements for a low beam. A light beam is produced with only one fixed characteristic by each individual headlight in the known headlight arrangement, so that many individual head lights are required in order to provide respective light beams with various characteristics. Among other things, an individual headlight is provided which produces a-light beam with strong lateral horizontal scattering of light on both sides of it and which, for example, is operated in fog or other situations in which visibility is poor.

SUMMARY OF THE INVENTION

It is an object of the present invention to provide an improved headlight arrangement for a vehicle, which produces respective light beams having a variety of different characteristics.

This object and others, which will be made more apparent hereinafter, are attained in a headlight arrangement for producing respective light beams with different characteristics, which comprises at least two headlight units, each of which has a number of individual headlights. The respective light beams are produced by the individual headlights, which are operable simultaneously and/or in different combinations.

According to the invention the propagation direction of a light beam from the individual basic headlight of at least one of the headlight units is changeable at least in approximately horizontal directions from a basic or initial direction. In the basic or initial direction the light beam is propagated at least approximately parallel to the light beam produced by the individual basic headlight of one of the other headlight units.

The headlight arrangement according to the invention has the advantage that a light beam is produced with a characteristic, with which the middle region in front of the vehicle, which would be illuminated by the basic beam with an unchanged course produced by the individual basic headlight, is less strongly illuminated. Instead of that a side region in front of the vehicle is more strongly illuminated, when the course of the light beam produced by the individual basic headlight of at least one of the headlight units is changed. This characteristic is especially advantageous in city traffic in order to guarantee a sufficient illumination, for example of sidewalks or of junctions or side streets.

Advantageous additional embodiments of the invention are described in the following.

In a preferred embodiment the course of the light beam produced by the individual basic headlight of at least one of the headlight units occurs at comparatively lower vehicle speed, i.e. below a predetermined vehicle speed. Because of this feature of this preferred embodiment the individual basic headlight is easily adjusted for city traffic in which the vehicle speed should be reduced.

BRIEF DESCRIPTION OF THE DRAWING

The objects, features and advantages of the invention will now be illustrated in more detail with the aid of the following description of the preferred embodiments, with reference to the accompanying figures in which:

FIG. 4 is a view of a measuring screen arranged in front of the vehicle which is illuminated by the basic light beams produced by the individual basic headlights of the headlight units; and.

Description of the Preferred Embodiments

Figure 1:
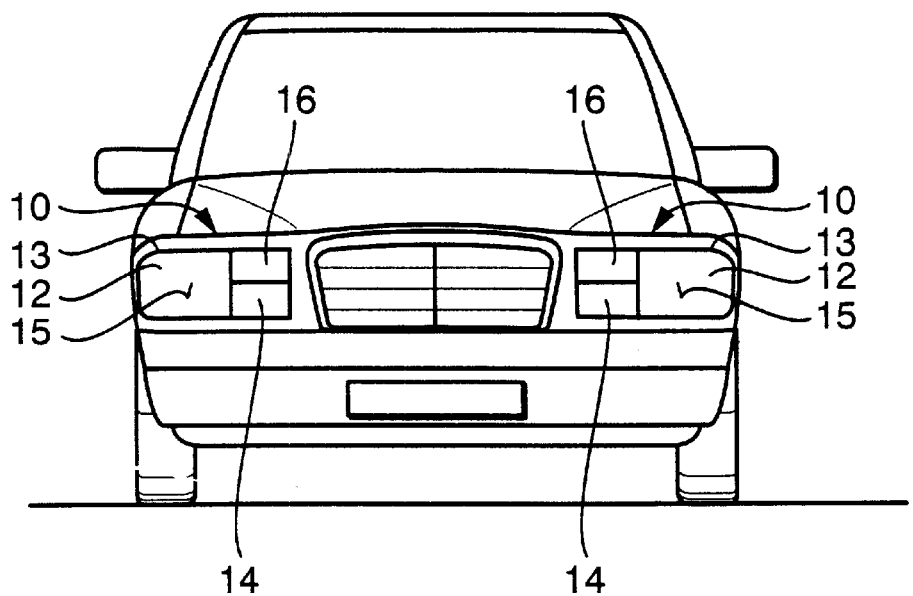
FIG. 1 is a front plan view of a vehicle equipped with a headlight arrangement according to the invention.

The headlight arrangement according to the invention for a vehicle, especially a motor vehicle, produces light beams with different characteristics. The headlight arrangement has at least two headlight units 10 arranged on the front end of the motor vehicle as shown in FIG. 1 in a known manner. The headlight units 10 are arranged near the outer edges of the respective vehicle sides. The headlight unit 10 has a plurality of individual headlights, which produce light beams with different characteristics. For example, the headlight unit 10 has three individual headlights 12, 14 and 16. The term."characteristic" of the light beam means its course in a horizontal and/or vertical direction, its light-dark boundary, its range and the light intensity distribution that it produces. The individual headlights 12, 14, 16 of the headlight unit 10 can be arranged in a common housing 13, whose light outlet opening is covered with a light permeable pane 15.

Figure 2:
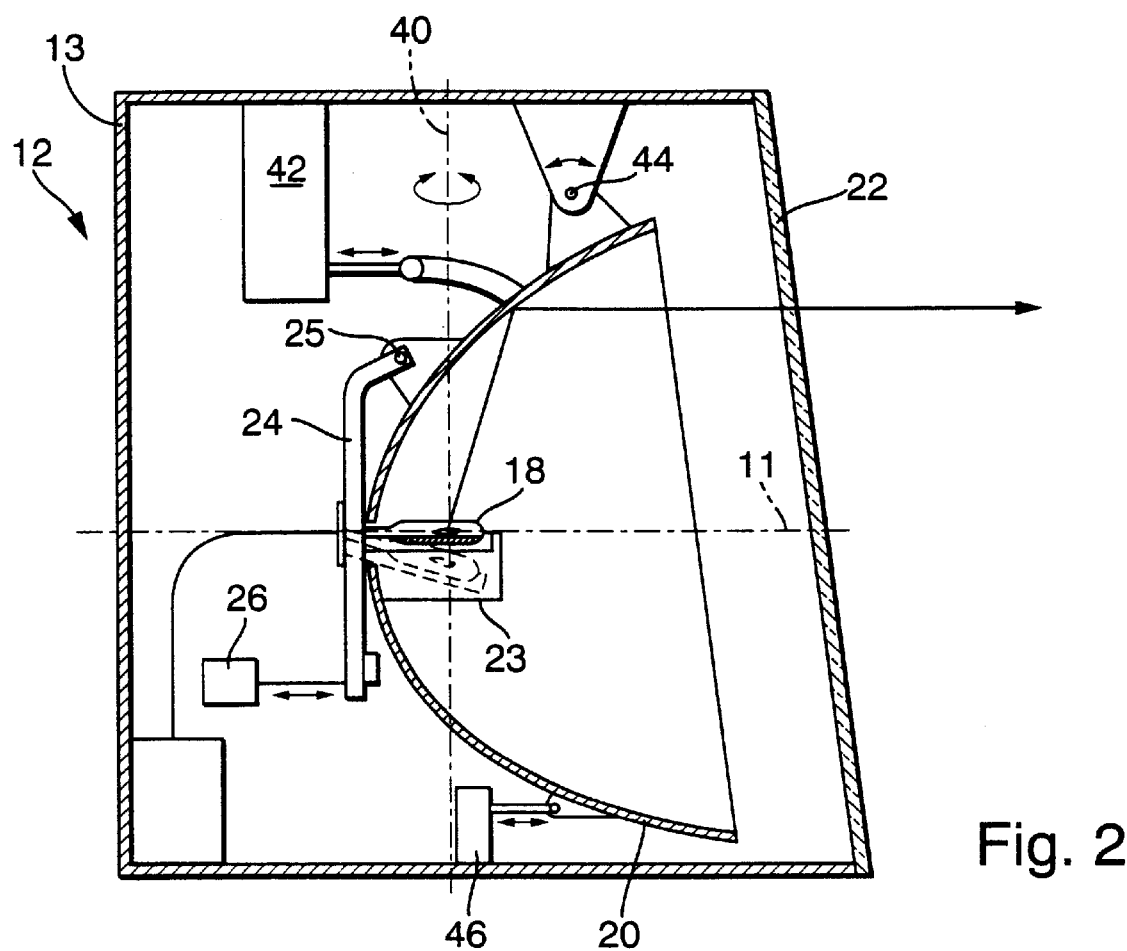
FIG. 2 is a longitudinal vertical cross-sectional view through an individual basic headlight of a headlight unit of the headlight arrangement according to a first embodiment.

The individual headlight 12 is the base headlight, by which a basic light beam is produced with a low beam characteristic. The base headlight 12 is shown in FIG. 2 according to a first embodiment and includes a light source 18 as well as a reflector 20. The light outlet opening of the base headlight 12 is covered with a light permeable pane 22, which can be smooth or have an optical profile over at least part of it, by which the light passing through it is scattered and/or deflected. The light source 18 can be an incandescent bulb or a gas discharge lamp with a suitable pre-switching unit. The individual basic headlight 12 according to a first embodiment of the invention is constructed according to the reflection principal, whereby in this case light reflected by the reflector 20 passes through the covering disk or pane 22.

The required characteristic of the basic light beam can be produced by a suitable form of the reflector 20, since light issuing from the light source 18 is reflected by the reflector 20 so that it has the required characteristic. Alternatively the reflector 20 can have a simple, for example approximately parabolic shape, whereby the required characteristic of the basic light beam from the base headlight 12 is obtained by a suitable optical shaping of the covering pane or disk 22. A screen element 23 can be provided to produce the light-dark boundary required for the low beam characteristic of the basic light beam, by which a part of the light issuing from the light source 18 is masked or blocked. The reflector 20 can be appropriately shaped to produce a light-dark boundary. Also the light source 18 can have several light emitting bodies, for example two filaments, by whose alternate operation a high beam can be produced as an alternative to. the basic light beam with the low beam characteristic. Alternatively the relationship between the light source 18 and the reflector 20 may be changeable, when the light source 18 is moveable relative to the reflector 20 or the reflector 20 is moveable relative to the light source 18. The light source 18 can be mounted on a lamp support 24, which, in turn, is pivotally mounted on the reflector 20 so that it can be pivoted about the approximately horizontal pivot axis 25, whereby the light source 18 is movable. The lamp support 24 on the reflector 20 is pivoted by means of a displacement device 26 engaged with it. The light beam produced by the base headlight 12 then has different characteristics because of the various arrangements of the light source 18 relative to the reflector 20, so that the basic light beam can be produced with low beam characteristics and with high beam characteristics.

Figure 3:
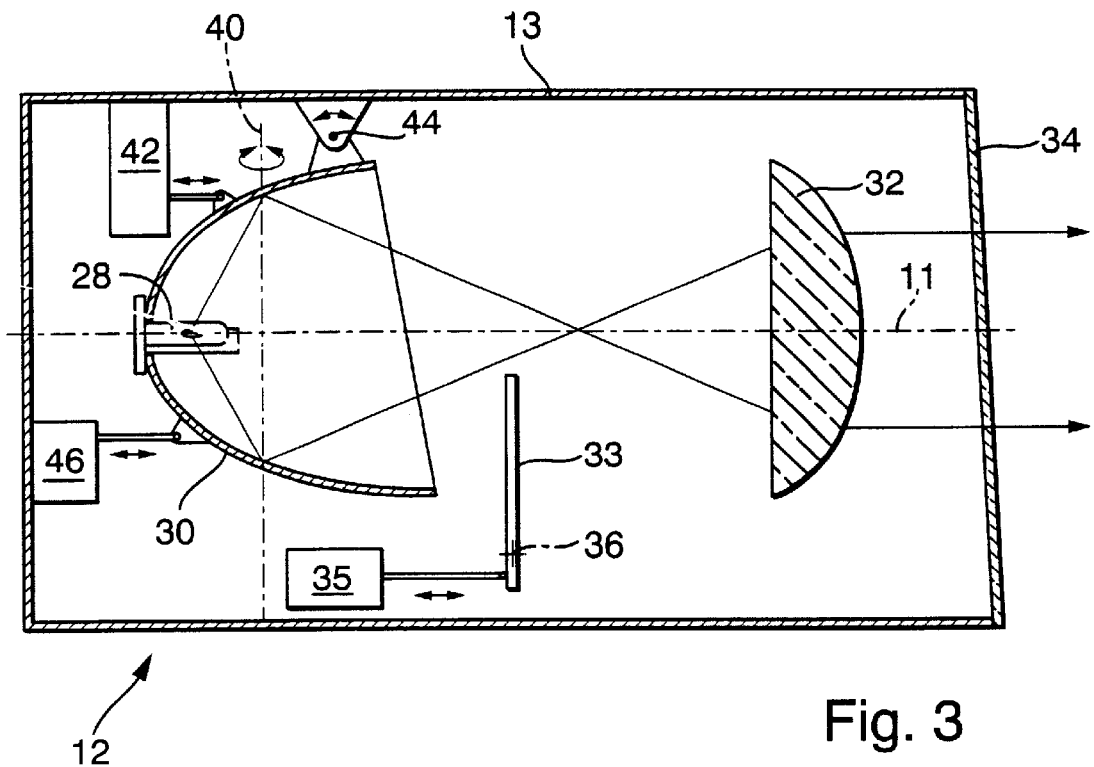
FIG. 3 is a longitudinal vertical cross-sectional view through an individual basic headlight of a headlight unit of the headlight arrangement according to a second embodiment.

The base headlight 12 can also be constructed according to a second embodiment illustrated in FIG. 3 based on the projection principle. This second embodiment of base headlight has a reflector 30, in which a light source 28 in the form of an incandescent bulb or a gas discharge lamp is mounted. A lens 32 is arranged in the light outlet opening following the reflector 30 and a screen element 33 is arranged between the reflector 30 and the lens 32. In the light outlet opening in front of the lens 32 a light permeable disk or pane 34 can be arranged, which can be a smooth pane or an optically profiled disk. The reflector 30 reflects the light propagated from the light source 28 as a convergent light beam. A part of the light beam reflected by the reflector 30 can be masked or blocked by the screen element 33 so that the light beam passing the screen element 33 has a light-dark boundary and passes through the lens 32, whereby the light beam is deflected and a light-dark boundary is formed. A basic light beam with low beam characteristics is produced by the base headlight according to this second embodiment when the screen element 33 or diaphragm, 33 is arranged in the path of the light beam reflected by the reflector 30.

The screen element 33 is light impermeable and is movable between a position for producing a high beam in which it does not extend into the path of the light beam reflected by the reflector 30 and a position for producing a basic low beam in which it does extend into the path of that light beam so that the base headlight can produced a high beam in this second embodiment. For example, the diaphragm 33 can be pivoted about an approximately horizontal pivot axis 36 by means of a displacement means 35. Alternatively, the screen element 33 can also be arranged in a fixed position, but is provided with changeable light permeability, so that the screen element 33 can be switched between a state with reduced light permeability for producing the basic light beam with low beam characteristics and a state with higher light permeability for producing a high beam.

Figure 4:
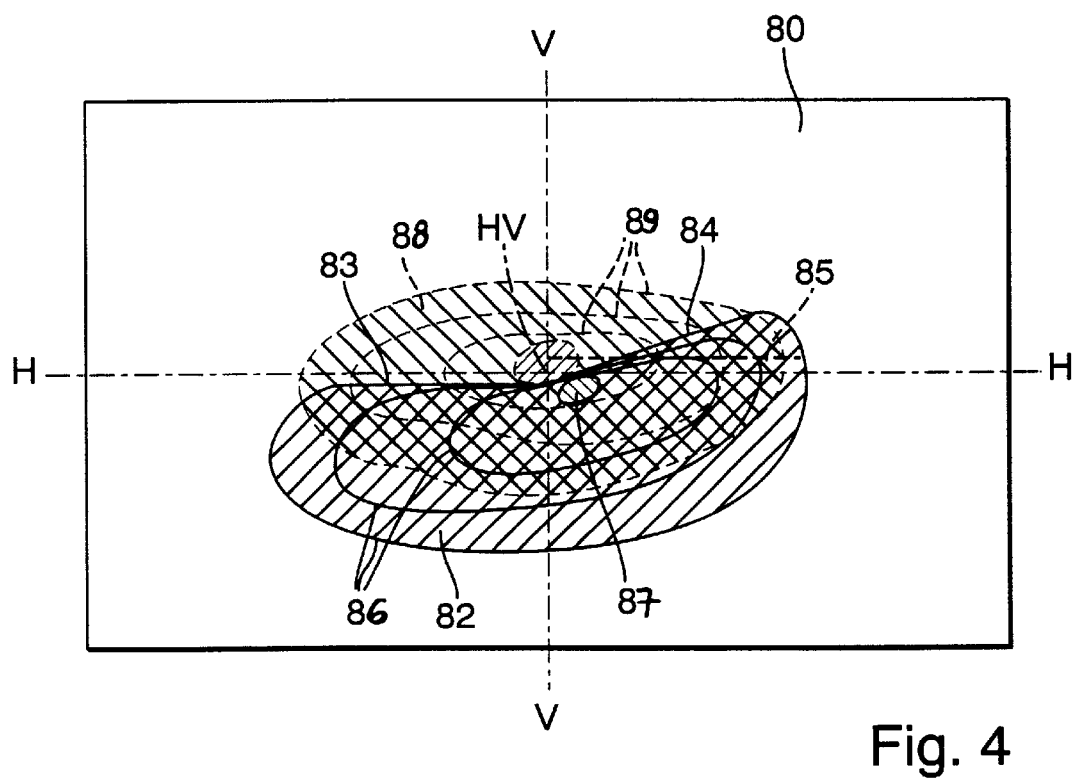

A measuring screen 80, which is illuminated by the light propagated from the base headlight 10 of the headlight unit, is arranged in front of the vehicle and spaced from it as shown in FIG. 4. The horizontal central plane of the measuring screen 80 is designated with HH and its vertical central plane with VV. The horizontal central plane HH and the vertical central plane VV intersect at the point HV.

The measuring screen 80 is illuminated in a region 82 by the basic low beam with low beam characteristics propagated by the headlight 12 according to the first or second embodiment of both headlight units 10. The headlight units 10 are designed for right hand traffic and the basic light beam has an an asymmetric light-dark boundary. The illuminated region 82 is bounded above by an asymmetric light-dark boundary, which has a horizontal section 83 on the opposing traffic side, which is the left side of the measuring screen 80, which extends about 1% below the horizontal central plane HH. On its own traffic side, which is the right side of the measuring screen 80, the light-dark boundary has a rising section 84 extending to the right from the horizontal section at an inclination angle relative to horizontal of e.g. about 15°. Alternatively the lightdark dark boundary on its own traffic side can also have an approximately. horizontal section 85 as shown with the dashed line in FIG. 4, which is arranged higher than the horizontal section 83 on the opposing traffic side. The distribution of light intensity in the region 82 is illustrated by several lines 86 of equal light intensity, so-called isolux lines. The highest illumination intensities in the region 82 are present in a zone 86 close to but below the light-dark boundary and somewhat to the right of the vertical central plane VV.

The high beam issuing from both headlights 12 of the headlight units 10 according to the first or section embodiment illuminates the measuring screen 80 in the region 88 according to FIG. 4. The region 88 has no definite light-dark boundary and higher light intensity values are present in it than in the region 82. Several isolux lines 89 are illustrated in region 88. The highest light intensity values are present in a zone 90 about the point HV.

According to the invention the propagation direction of the light beam produced by the base headlight 12 of at least one of the headlight units 10 is changeable in at least approximately horizontal directions. The course of the light beam produced by the base headlight 12 can be changed by pivoting at least portion of the base headlight 12 about an at least approximately vertical axis 40. In fact, the entire base headlight 12 can be pivoted about the axis 40. Alternatively only the reflector 20 with the light source 18 is pivoted about the axis 40 in the base headlight 12 constructed according to the reflection principle. With the base headlight 12 according to the second embodiment according to the projection principle the reflector 30 with the light source 28, the lens 32 and the screen element 33, which can be constructed together as a reflector insert, can be pivoted about the axis 40. Also the propagation direction of the light beam produced by the base headlight 12 can be changed by motions, especially pivoting of the light source 18 and/or 28, the screen device 23, the lens 32 and/or the screen element 33. An embodiment is described in the following hereinbelow in which the base headlight is pivoted entirely or partially about a vertically extending pivot axis 40.

A displacement device or means 42 engages eccentrically to the pivot axis 40 on the base headlight 12 in order to pivot the base headlight 12. The displacement means 42, for example, can be a drive unit with an electric motor or a motorized drive. The optic axes 11 of base headlights 12 in both headlight units 10 of the vehicle extend at least approximately parallel to each other in the not-pivoted positions of the base headlights 12. Pivoting of the base headlights 12 of the right and the left headlight units 10 of the vehicle occurs. in opposite directions and indeed to or from respective opposite sides of the vehicle. For example, the base headlight 12 of the right headlight unit 10 is pivoted about the vertical axis 40 to the right when viewed from above in a clockwise direction. The base headlight 12 of the left headlight unit 10 is pivoted about the vertical axis 40 in a counterclockwise direction to the left. If the base headlights 12 are pivoted about the axes 40 in this manner, the optic axis 11 of the base headlight 12 of the right headlight unit 10 points to the right in the light propagation direction. The optic axis 11 of the base headlight 12 of the left headlight unit 10 points to the left in the light propagation direction. The optic axes 11 of the base headlights 12 of both headlight units 10 are thus divergent. Alternatively the base headlight 12 of the right headlight unit 10 can be pivoted about the vertical axis 40 toward the left in the counterclockwise direction. The base headlight 12 of the left headlight unit 10 can be pivoted in the clockwise direction to the right about the axis 40. The optic axes 11 of the base headlights 12 of both headlight units 10 then converge.

Figure 5:
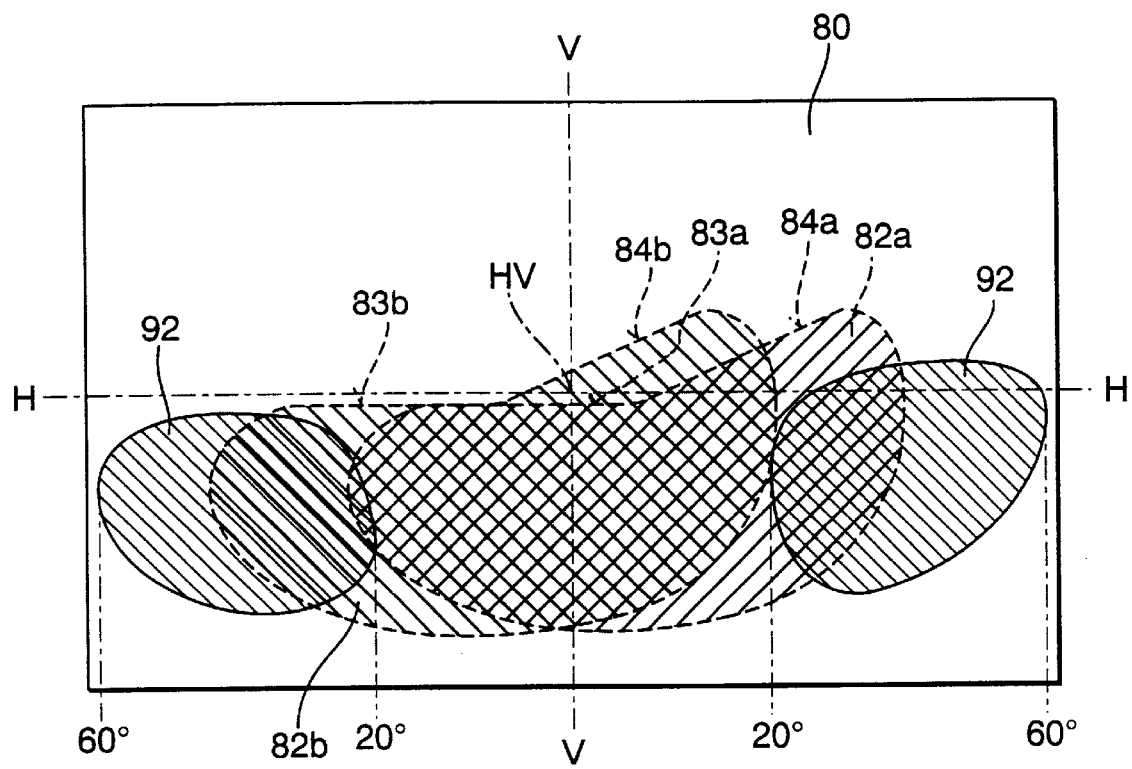
FIG. 5 is another view of the measuring screen arranged in front of the vehicle which is illuminated by the light beams produced by the individual basic headlights of the headlight units, but with changed characteristics.

The measuring screen 80 illuminated by the basic light beams with low beam characteristics produced by the base headlights 12 of both headlight units 10 and with both headlight units pivoted about the vertical axes 40 is shown in FIG. 5. The regions 82a and 82b illuminated by the basic light beams are no longer completely coincident in this case, but are displaced from each other. If the base headlights 12 of the headlight units 10 are pivoted about the pivot axes 40, their optic axes diverge, so that the region 82a displaced toward the right is illuminated by the base headlight 12 of the right headlight unit 10 and the region 82b displaced toward the left is illuminated by the base headlight of the left headlight unit 10. If the base headlights 12 of the headlight units 10 are pivoted about the pivot axes 40, their optic axes converge, so that the region 82a displaced toward the right is illuminated by the base headlight 12 of the left headlight unit 10 and the region 82b displaced toward the left is illuminated by the base headlight of the right headlight unit 10. In both case a wider horizontal portion of the measuring screen 80 is illuminated than the region 82 of the corresponding FIG. 4. If only the base headlight 12 of only one headlight unit 10 is pivoted, only the region 82a or 82b illuminated by the light beam produced by it is displaced.

The base headlights 12 of the headlight units 10 are pivoted in the described manner so that their light beams are swung from the approximately parallel propagation directions preferably in city traffic, when the vehicle is moving at slow speed. In this case no bright illumination of portions of the road far from the vehicle is required, but sufficient lateral illumination is required in front of the vehicle, where sidewalks, driveways for homes or parking locations, intersections or places where portions of the traffic branch off.

A pivoting of the base headlights 12 of both headlight units 10 can thus occur for example at lower vehicle speeds. A comparatively simple controller or control device can be provided by which the displacement means 42 can be controlled according to the vehicle speed detected by it. A predetermined fixed speed threshold for the vehicle speed can be provided, under which the base. headlights 12 are pivoted through predetermined angles about the vertical axis 40 and above which the base headlights 12 are adjusted so that their optic axes 11 extend substantially parallel to each other. Alternatively the base headlights 12 of both headlight units 10 are pivoted in several steps -or continuously through greater angles with decreasing vehicle speeds. The maximum angle, to which the base headlight 12 of one of the headlight units 10 can be pivoted about the vertical axes 40 from its basic parallel direction, amounts to between 5° and 20°, preferably between 5° and 10° or 15°. Alternatively or additionally to the above-described speed-dependent pivoting of the base headlights 12, pivoting can also occur when the vehicle moves in a city area or generally in a closed built-up area. In order to determine whether or not the vehicle is located in regions of this type a navigation system of the vehicle can be used. Road or street network information is stored together with other information regarding the type of roads or localities in the navigation system. The navigation system determines the actual location of the vehicle on the road network by signals from satellites. Alternatively or in addition, a video camera can be provided which views the area in front of the vehicle. The video camera is connected to an analysis unit including means for determining the type of region through which the vehicle is passing and whether or not to pivot the base headlights about their vertical axes 40.

In other preferred embodiments the propagation direction of the light beam produced by the base headlight 12 of at least one of the headlight units 10 is changeable in at least an approximately vertical direction. By pivoting at least a part of the base headlight 12 about an at least approximately horizontally extending axis 44.the course of the light beam in an at least approximately vertical direction can be changed. The pivotability about the horizontal axis 44 can be provided, for example, with an adjustment of the illumination width of the headlight unit-10 and/or the base headlight 12, which is independent of the inclination of the vehicle. The illumination width can be held constant independently of the inclination of the vehicle structure. The inclination of the is vehicle depends on the loading of the vehicle body or on the dynamic motions of the vehicle body and the illumination width should be maintained constant independently of it. For this purpose the entire headlight unit 10, the base headlight 12 or at least its reflector should be pivoted about the horizontal axis 44 by means of the displacement device 46. A downward pivoting of the base headlight 12 about the horizontal axis 44 is accompanied by a pivoting of the base headlight unit 12 about the vertical axis 40 according to the invention. As a result of the downward pivoting of the base headlight 12 about the horizontal axis 44 the regions-82a and 82b illuminated by the basic light beam produced by the base headlight 12 are lower on the measuring screen 80 than the illuminated region 82 according to FIG. 4 with the base headlight not pivoted downward. Accordingly the light-dark boundaries 83a, 84a and/or 83b, 84b of the regions 82a,82b according to FIG. 5 are lower than the light-dark boundaries 83,84 of region 82 according to FIG. 4. Because of this lowering a blinding of the opposing traffic by the rising section 84b of the light-dark boundary of the region 82b on the opposing traffic side is avoided when the base headlight 12 is pivoted about the vertical axis 40. The maximum angle, to which the base headlight 12 of the headlight unit 10 is pivoted about the pivot axis 44 in the lo vertical direction, amounts to e.g. from about 0.5° to 1.5°.

The auxiliary headlights 14 of the headlight units 10 produce laterally directed light beams, which illuminate side regions in front of the vehicle. Each auxiliary headlight 14 is preferably constructed according to the reflection principle like the base headlight 12 according to the first embodiment. The It auxiliary headlight 14 of the right headlight unit 10 produces a light beam that is preferably directed toward the right. The auxiliary headlight 14 of the left headlight unit 10 produces a light beam that is preferably directed toward the left. The light beams produced by the auxiliary headlights 14 illuminate regions indicated with 92 in FIG. 5. The regions 92 are preferably arranged so that they each only slightly overlap the regions 82a, 82b, which are illuminated by the basic light beams produced by the pivoted base headlights 12; The regions 92 extend over the regions 82a, 82b in the nearly horizontal directions so that the light beams produced by the auxiliary headlights illuminate additional side regions in front of the vehicle. The auxiliary headlights 14 are operated when the vehicle travels around a tight curve or turns off the road. The auxiliary headlights 14 can also be operated at reduced vehicle speed, together with the base headlights 12 pivoted about the pivot axes 40. The respective light sources of the auxiliary headlight units 14 together with the light sources of the base headlights 12 and/or the light sources of the base headlights 12 themselves can be operated simultaneously at reduced vehicle speed only with reduced power that is less than their nominal power.

The additional headlights 16 of the headlight units 10 produce lo concentrated light beams. The additional headlights 16 are constructed according to the reflection principle like the base headlight of the first embodiment. The region 94 of the measuring screen 80 in FIG. 4 is close to, but under, the light-dark boundaries 83,84 is illuminated by the light beams produced by the additional headlights 16 and preferably illuminated on its own in traffic side. The light beams produced by the additional headlights 16 provide the far regions in front of the vehicle with additional light intensity on the vehicle's own traffic side in a spot-like manner.

The. disclosure in German Patent Application 199 61 942.5 of Dec. 22, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a headlight arrangement for producing respective light beams with different characteristics, it is not intended to be limited to the details shown, since various modifications and changes-may be made without departing in any way from the spirit of the present invention.

Without further analysis, the foregoing will so fully reveal the gist of the present invention that others can, by applying current knowledge, readily adapt it for various applications without omitting features that, from the standpoint of; prior art, fairly constitute essential characteristics of the generic or specific aspects of this invention.

What is claimed is new and is set forth in the following appended claims.

I claim:

1. A headlight arrangement in a vehicle for producing respective light beams with different characteristics, said headlight arrangement comprising, at least two headlight units (10), each having a plurality of individual headlights (12, 14, 16), by means of which said respective light beams are produced, and means for operating said individual headlights simultaneously, in different combinations or both simultaneously and in different combinations;

wherein said individual headlights of each of the headlight units (10) include a base headlight (12) and means for changing a propagation direction of a light beam produced by the base headlight (12) of at least one of the headlight units independently from the other individual headlights at least in approximately horizontal directions from a basic direction and wherein a light beam produced by the base headlight (12) of one of the headlight units is propagated in a direction which is at least approximately parallel to a direction of a light beam produced by the base headlight (12) of another of the headlight units, and at least one of said headlight units (10) includes an auxiliary headlight (14) including means for propagating an additional light beam laterally, whereby a side region in front of the vehicle is illuminated, and means for turning said auxiliary headlight (14) is provided in addition to said base headlight (12) of said at least one of said headlight units (10) when said propagation direction of said light beam from said headlight (12) of said at least one of said headlight units is changed by means for changing said propagation direction of said light beam in said approximately horizontal directions.

2. The headlight arrangement as defined in claim 1, wherein said means for changing said propagation direction includes means for making propagation direction changes of said light beamds of the base headlights of two of said headlight units at least in said approximately horizontal directions and said two of said headlight units are arranged on respective opposite sides of said vehicle.

3. The headlight arrangement as defined in claim 2, wherein said means for making said propagation direction changes of said light beams produced by said base headlights makes said light beams diverge from each other.

4. The headlight arrangement as defined in claim 2, wherein said means for making said propagation direction changes of said light beams produced by said base headlights makes said light beams converge toward each other.

5. The headlight arrangement as defined in claim 1, wherein said means for changing said propagation direction changes said propagation direction when a speed of the vehicle is less than a predetermined threshold speed.

6. The headlight arrangement as defined in claim 5, wherein said means for changing said propagation direction changes said propagation direction increasingly further from said basic direction as said speed of said vehicle decreases below said predetermined threshold speed.

7. The headlight arrangement as defined in claim 1, wherein said means for changing said propagation direction changes said propagation direction of said one of said light beams from said basic direction up to a maximum horizontal angle of between 5° and 20°.

8. The headlight arrangement as defined in claim 7, wherein said maximum angle is between 5° and 10°.

9. The headlight arrangement as defined in claim 1, further comprising means for changing said propagation direction of said one of the light beams produced by the base headlight of said at least one of the headlight units at least in approximately vertical directions from said basic direction in which said one of the light beams is propagated at least approximately parallel to said another of the light beams produced by the individual basic headlight of said another of the headlight units, and so that said propagation direction is lowered or inclined downward relative to said basic direction when said propagation direction is changed in said approximately horizontal directions.

10. The headlight arrangement as defined in claim 9, wherein said propagating direction is changeable up to a maximum vertical angle of between 0.5 to 1.5° from said basic direction by means for changing said propagation direction of said one of said light beams produced by said base headlight of said one of said at least one headlight units (10) in said approximately vertical directions.

11. The headlight arrangement as defined in claim 1 or 9, wherein said means for changing said propagation direction of said one of the light beams produced by the base headlight of said at least one of the headlight units in said approximately horizontal directions from said basic direction comprises means for pivoting at least a part of said base headlight (12) of said at least one of said headlight units about an at least approximately vertical axis (40).

12. The headlight arrangement as defined in claim 9, wherein said means for changing said propagation direction of said one of the light beams produced by the base headlight of said at least one of the headlight units in said approximately vertical directions from said basic direction comprises means for pivoting at least a part of said base headlight (12) of said at least one of said headlight units about an at least approximately horizontal axis (44).

13. The headlight arrangement as defined in claim 9, wherein said means for changing said propagation direction of said one of the light beams produced by the base headlight of said at least one of the headlight units in said approximately horizontal directions from said basic direction comprises means for pivoting at least a part of said base headlight (12) of said at least one of said headlight units about an at least approximately vertical axis (40) and said means for changing said propagation direction of said one of the light beams produced by the base headlight of said at least one of the headlight units in said approximately vertical directions from said basic direction comprises means for pivoting at least a part of said base headlight (12) of said at least one of said headlight units about an at least approximately horizontal axis (44).

* * * * *